Nov. 26, 1946.    C. M. SEMLER    2,411,558
VULCANIZATION APPARATUS
Filed Aug. 12, 1944    2 Sheets-Sheet 1
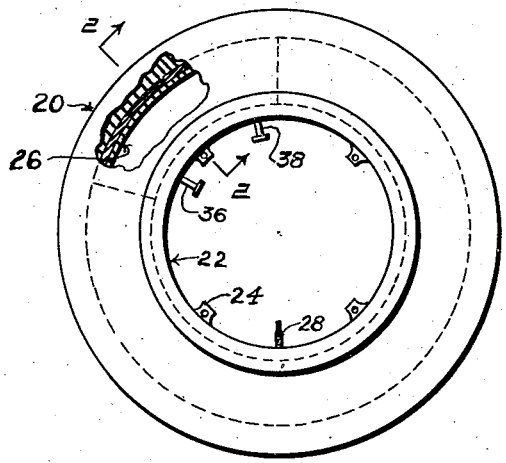
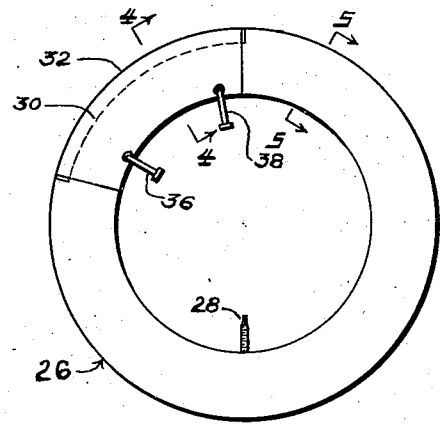
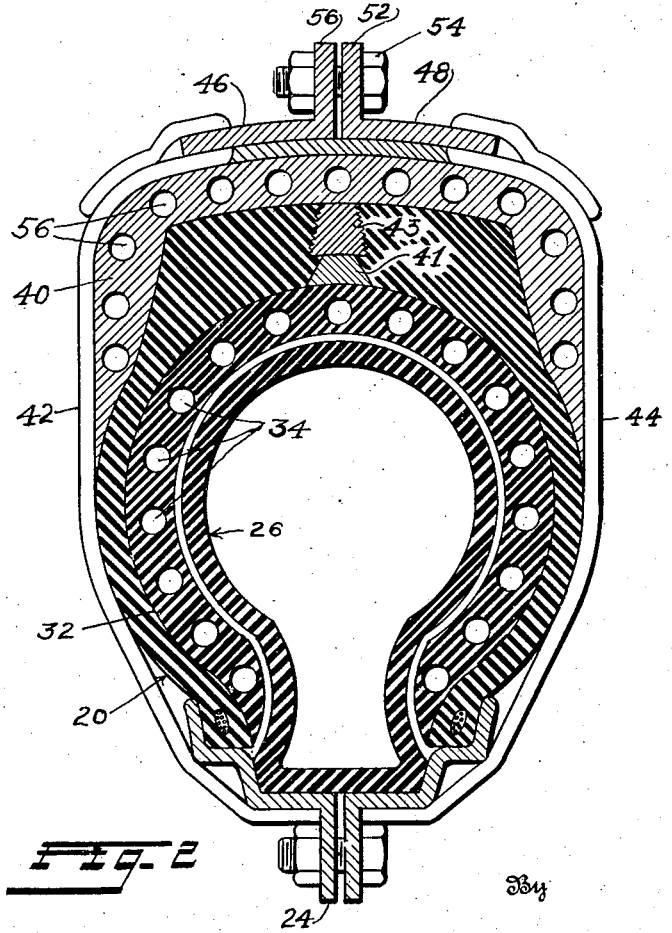
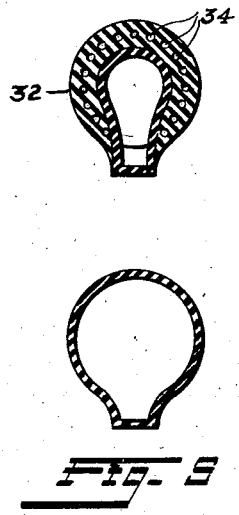
Inventor
CLYDE M. SEMLER
By Strauch & Hoffman
Attorneys Nov. 26, 1946.   C. M. SEMLER   2,411,558
VULCANIZATION APPARATUS
Filed Aug. 12, 1944   2 Sheets-Sheet 2
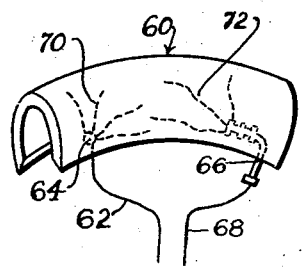
Fig. 6
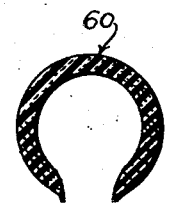
Fig. 7
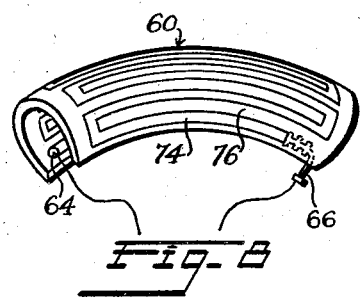
Fig. 8
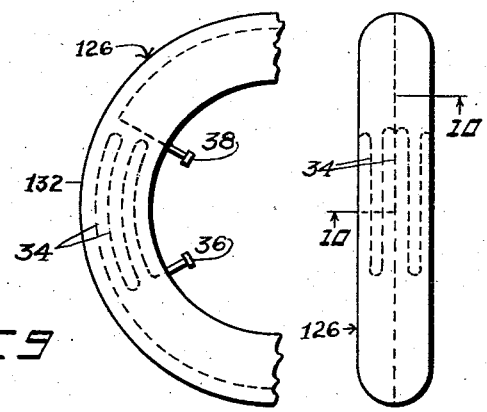
Fig. 9
Fig. 9A
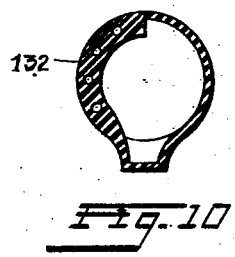
Fig. 10
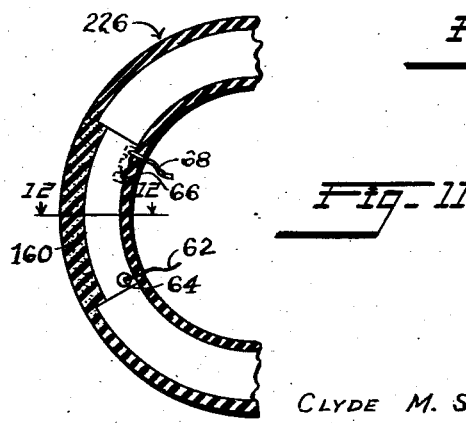
Fig. 11
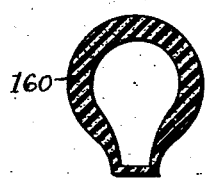
Fig. 12
Inventor
CLYDE M. SEMLER
By Strauch & Hoffman
Attorneys Patented Nov. 26, 1946

2,411,558

UNITED STATES PATENT OFFICE 2,411,558

VULCANIZATION APPARATUS

Clyde M. Semler, Cuyahoga Falls, Ohio

Application August 12, 1944, Serial No. 549,176

6 Claims. (Cl. 18—18)

This invention relates to vulcanization apparatus and is more particularly concerned with apparatus for making local repairs in automobile tire casings and the like without the use of expensive molds and similar apparatus.

There has been considerable activity in developing tire repair apparatus, especially since the reduction in supply of natural rubber due to present war time conditions. Several types of vulcanization apparatus for making local repairs on tire casings have been developed and are in general use. These prior devices comprise mainly, either devices in which the whole tire is placed in a relatively heavy mold to keep the heat in during the vulcanization process or a so-called sectional bag type which is designed more for smaller repairs while the larger and heavier mold device is used for retreading and extensive repair jobs.

While these two forms of apparatus, if operated by competent workmen turn out good repair work, each has its limitations especially in the matter of facility of transportation and expense of equipment and operation. The mold apparatus is usually an extremely heavy cumbersome apparatus which cannot readily be moved from one point to another, which means that its usefulness is limited to a particular station. This mold apparatus is also quite expensive.

The sectional bag, which usually comprises a tubular expansible bag shaped as a sector of an annulus having its ends closed by rigid metal plates for preventing end blow-out of the sector, is less expensive than the mold apparatus but its cost runs sufficiently high so that it is not practical for use in some of the ordinary repair stations, such as gasoline filling stations where only occasional vulcanization jobs are encountered.

The present invention contemplates a vulcanization apparatus which is relatively inexpensive and easy to transport and which is of sufficiently low cost that it may be embodied in the regular equipment of the usual gasoline filling station and which will do a vulcanizing job superior to that accomplished by the best molding or sectional bag apparatus.

As far as I am aware, the molds which have previously been used have necessitated distorting or flattening the casing during the curing process so that the repair is not formed to the shape of the tire when in use so that strains are caused in the repair material as soon as the casing assumes its normal operative shape. When the improved apparatus of the invention is used, the repair is made while the casing is fully inflated and has its normal operative shape and no continuous strain is imposed on the repair material when the repaired casing is put back into use.

With the above in mind it is the major object of the present invention to provide a repair curing or vulcanizing apparatus comprising an endless tubular bag having a sector thereof provided with a heated wall region adapted to be located beneath the repair to be made in an automobile tire casing or the like.

It is a further object of the invention to provide an expansible inflatable endless tubular bag having a reduced portion adapted to receive a heating sleeve, the whole being of substantially uniform diameter and of uniform annular cross section when the device is inserted within a tire casing or the like for providing an expansible, highly heated heat region for localized heating of an area containing a spot to be repaired.

A further object of the invention is to provide a novel removable sleeve to fit around a tubular expansible tire repair apparatus which sleeve is made of electrically conductive rubber or like material and is adapted to provide a smooth uniform heating surface for vulcanization.

A further object of the invention is to provide a novel apparatus for vulcanizing a localized spot to be repaired in an annular object such as an automobile tire casing wherein a heated sleeve is expansibly pressed against the inner surface of the tire at the region to be repaired, and heat and pressure are applied outside the tire in the same region whereby considerable localized heat is applied to the tire at the point to be repaired and there is no necessity for using expensive sectional bags or molds or the like.

Further objects of the invention will presently appear as the description proceeds in connection with the drawings wherein:

Figure 1 is a side elevation of a tire casing and supporting rim, a portion being broken away and shown in section to illustrate the application thereto of repair apparatus constructed according to the invention;

Figure 2 is a sectional view on an enlarged scale on line 2—2 of Figure 1;

Figure 3 is a side elevation of a novel endless tire repair bag having a reduced section adapted to receive a separate heat sleeve;

Figures 4 and 5 are sections on lines 4—4 and 5—5 of Figure 3;

Figures 6 and 7 are elevation and section, respectively, of a novel heat conducting rubber sleeve constructed according to the invention;

Figure 8 is an elevational view of another form of heat conducting sleeve constructed according to the invention;

Figure 9 is a side elevational view of a modified form of an endless tire repair bag;

Figure 9A is a peripheral elevational view of the tire repair bag shown in Figure 9;

Figure 10 is a transverse sectional view on the line 10—10 of Figure 9A;

Figure 11 is a radial sectional view of a further modified form of endless tire repair bag constructed according to the invention; and Figure 12 is a transverse sectional view on the line 12—12 of Figure 11.

With continued reference to the drawings and particularly to Figures 1 to 5, inclusive, the numeral 20 generally indicates an automobile tire casing shown to better illustrate the construction and operation of the improved tire repair apparatus constituting the subject matter of the invention.

While the casing is being repaired it is mounted on a rim structure, generally indicated at 22, which may be a standard rim but which, for convenience in the repair operation, is preferably a special split rim having a plurality of lugs 24 secured to the opposite halves thereof and provided with registerable apertures through which suitable clamp bolts may be passed to secure the two parts of the rim together. For further convenience in the repair operation, one half of the split rim may be permanently secured to a suitable fixture, not illustrated, which may also carry a heat generating plant such as a steam generator or suitable electric current converting apparatus.

An endless tire repair bag 26, particularly illustrated in Fig. 3 replaces the rigid metal molds and sectional bags heretofore used in repairing tire casings by vulcanizing or curing new rubber into breaks or punctures in the casing and is an annular, toroidal member, generally of the form of the inner tube normally used to retain the compressed air within the casing of a pneumatic tire. The bag 26 is formed of elastic material, preferably rubber or synthetic rubber, and is provided with an ordinary tire check valve 28 through which air may be forced into the bag 26 from a suitable compressor to inflate the bag.

Along one portion of its annular extent the bag 26 is provided with a reduced, cored out portion 30 which receives a separate and removable heating element or pad 32. The reduction in the size of the bag 26 over the reduced portion is substantially the same as the wall thickness of the heating element so that when the element is mounted on the reduced portion of the bag, as shown in Figure 3, the toroidal diameter of the bag is substantially the same around the entire annular extent thereof and the outer surface of the bag and the heating elements are smooth and continuous.

The heating element or pad 32, as shown in section in Figure 4, may comprise a plurality of conduits 34 interconnected to form a single continuous passage longitudinally back and forth through the heating element, the opposite ends of the passage being connected with terminals or nipples 36 and 38 which project beyond the outer surface of the heating element to receive the associated ends of heat conducting conduits, such as hose connections leading from a suitable steam generator. One of the nipples would be connected to the generator steam outlet and the other to the return line to the generator to provide for a continuous flow of steam through the passage in the heating element.

When it is desired to repair a tire casing the break or aperture is cleaned and, if necessary, enlarged and new unvulcanized rubber or rubber and fabric is placed in the break or aperture in the conventional manner.

With the heating pad or element 32 in place on the reduced portion thereof, the tire repair bag in a collapsed or uninflated condition is then inserted in the casing in position such that the heating element is directly under the repair material. The casing with the repair bag 26 in place therein is then mounted on the rim 22 and the two portions of the rim are secured together by means of suitable bolts or clamps extending through the lugs 24 with the terminals or nipples 36 and 38 and the air valve 28 projecting through the rim so that the steam and air conduits may be associated therewith. After the two portions of the rim are secured together an outer curing block 40 is placed on the outer surface of the tire, covering the repair material and is secured in place by suitable means such as the straps 42 and 44 which are secured at adjacent ends to the rim lugs 24 and at their opposite ends to a pair of plates 46 and 48 having bent up apertured ears or lugs 50 and 52 through which a bolt 54 is inserted to draw the plates together and force the block 40 down on the tire by tightening the straps 42 and 44.

After the outside block 40 is secured in position compressed air is forced into the bag 26 through the air valve 28 until the desired curing pressure is reached. The pressure on outside block 40 is then adjusted by tightening or loosening the nut on bolt 54 until the distance between the outer portions of the tire side walls adjacent the block is the same as the distance between the side walls of the remaining annular extent of the tire casing. The nipples 36 and 38 are then connected to the steam conduit of a suitable steam generator and steam is forced into the heating element 32 until the vulcanizing or curing of the rubber is complete.

The outside block 40 may also be provided with a steam passage, as indicated at 56, and the ends of this passage may be provided with terminals or nipples similar to the nipples 36 and 38 which may be simultaneously connected with steam conduits leading from the steam generator so that the outside block is heated simultaneously with the heating element 32 and the new rubber, indicated at 41 and 43 is cured or vulcanized from both the inside and the outside simultaneously greatly reducing the time normally required for such a cure and providing a much more satisfactory condition of the newly cured rubber.

While the outside block 40 is normally the only element applied to the exterior of the tire or casing, if desired, and if the air pressure to be used in the tire repair bag 26 is above the safe pressure limit of the casing, the remainder of the casing may be wrapped or reinforced by suitable means such as by additional straps secured to the remaining lug or wrapped around the casing and the rim 22. The straps 42 and 44 may be made of any suitable material such as leather or fabric impregnated rubber or even of metal but I have successfully used a material known as muslin wrapping which material has been formerly used to wrap inner tubes into curing mandrels and for other purposes in tire manufacture and repair. I find that this material is inexpensive, light in weight, and easy to handle, and relatively free from stretch under the force exerted by the air pressure in the repair bag 26.

The outside block 40 may conveniently be made of metal such as aluminum, but the inner heating elements 32 must be flexible in order to conform exactly to the shape and size of the interior of the casing being repaired.

The heating element 32 may be formed of a flexible conduit which may be made of rubber, or may be of a flexible metal construction embedded in a suitable thickness of flexible material, such as rubber or synthetic rubber, so that both sides of the heating element are smooth and the pressure exerted on the interior of the casing by the heating element is substantially uniform from all units of the heating element area.

It is contemplated that a single endless tire repair bag may be used for casings of sizes varying over a reasonable range as the material of the bag may be stretched to a considerable extent without harmful effect. For large differences in casing sizes however it will be necessary to provide different size repair bags. This may be done easily and economically however since the endless tire repair bag may be conveniently formed in the same mold in which the tire inner tubes are formed. When the repair bag is formed in the inner tube molds, a suitable insert may be added to the mold which will provide the reduced portion 30 upon which the heating element 32 is to be mounted. This will not occasion any material additional expense or give rise to any serious problems in the manufacture of the repair bags in the inner tube molds.

Figures 6, 7 and 8 disclose a modified form of heating elements as generally indicated at 60 in Figures 6 and 7 and 69 in Figure 8.

In the arrangement shown in Figures 6 and 7 the heating element 60 is formed of a composition which provides an electrically conductive flexible material. Such material may be formed of different components used in different proportions but a suitable material is provided from a composition of synthetic rubber impregnated with electrically conductive particles to an extent such that electric current will flow readily therethrough. As such material has a relatively high electrical resistance, when a piece of said material is included in an electric circuit a large amount of heat is generated in the material. In the arrangement shown in Figures 6 and 7, the electric circuit is led into one end of the heating element 60 through a conduit 62 and a thermostat 64 which acts to control the temperature of the heating element. At the other end of the element a terminal member 66 is embedded in the material of the heating element and leads outside of the element to an electrical conduit 68, the conduits 62 and 68 being connected with a suitable source of electrical energy. If desired wires 70 may lead from the thermostat through the material adjacent thereto in order to more generally distribute the current through the entire mass of the conductor material and similar wires 72 may lead from the material to the terminal member 66. These wires may, however, be omitted where the conductivity of the material is sufficient to provide uniform heating without their use.

The arrangement shown in Figure 8 is substantially the same as that shown in Figures 6 and 7 except that the electrically conductive flexible material or rubber is laid up in strips alternating with other flexible material such as ordinary rubber having high electrical resistance. In this arrangement the electrically conductive material is arranged in overlapping strips or layers 74 separated by electrically resistant rubber material in alternating strips or layers 76 in such a manner that the conductive material provides a single passage leading back and forth from end to end of the heating element and entirely around it from one edge to the other.

The heating element shown in Figures 6, 7 and 8 may be used in the same manner as that disclosed in Figures 2, 3 and 4 as it may be inserted in the reduced portion of the endless tire repair bag 26 in the manner described above.

All of the removable heater elements are discontinuous at the inner or bottom portion so that they may be readily slipped over the reduced portion in the repair bag and the edge portions of these heater elements are reduced in thickness or feathered so that the heater elements will conform to the shape of the tube when inflated in the casing, as is particularly shown in Figures 2 and 4.

While it is entirely convenient and often most desirable to use endless tire repair bags and separate replaceable sectional heater pads, as hereinabove described in connection with Figures 1 to 8 inclusive, it is also within the scope of the invention to make the heater element integral with the tire repair bag as shown in Figures 9 to 12 inclusive.

Figures 9, 9A and 10 show a steam or other fluid heating element, such as is shown in Figures 2 and 4, formed integrally with a portion of the endless tire repair bag, generally indicated at 126. This integral bag may be formed by placing the preformed heating element in the inner tube mold before the remainder of the bag is formed therewith. The bag will then be formed around and integrally bonded to the heating element.

Figures 11 and 12 show a heating element of the form particularly shown in Figures 6 and 7 formed integrally with the endless tire repair bag, generally indicated at 226. The heating element is the same as that described in connection with Figures 6 and 7 and has thermostat 64 and terminal 66 connected with the electrical conductors 62 and 68 respectively.

It is also possible to provide the heating element shown in Figure 8 integrally with the endless tire repair bag in the same manner.

Having the bag and heating elements integral provides a more convenient arrangement and will thus save time and facilitate the repair operation. The separate construction however, has the offsetting advantage that injury to the heating element or to the bag will not necessitate replacement of both elements and might thus provide a somewhat more economical arrangement over a long period of service.

When it is desired to cure the entire circumference of the casing at one time, as in retreading or in the manufacture of casings, a number of removable heating elements or sleeves sufficient to extend entirely around the interior of the casing, may be applied to a suitable inflatable endless repair bag and disposed within the casing. Also a single removable sleeve which extends entirely around the interior of the casing may be used and such a sleeve may be made integral with the endless repair bag without exceeding the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for repairing a tire or like casing by vulcanization comprising an annular toroidal inflatable bag of resilient material dimensioned to closely fit within the interior of said casing, and means providing a circumferentially localized heater region extending over a sector portion only of the annular extent of said bag for underlying a corresponding sector portion of said casing containing the area to be repaired by vulcanization, said bag including said heater region having substantially uniform diameter throughout when inflated within a casing.

2. Apparatus for repairing a tire or like casing by vulcanization comprising an annular, toroidal, inflatable bag of resilient material dimensioned to closely fit within said casing interior when inflated, means providing a circumferentially localized heater region extending over a sector portion only of the annular extent of said bag for underlying a corresponding sector portion of said casing containing the area to be repaired by vulcanization, said bag including said heater region having substantially uniform diameter throughout when inflated within said casing, a support shaped similarly to the usual pneumatic tired wheel rim for mounting said casing with said inflated bag therewithin, said casing and bag being relatively shiftable on said support to locate said sector portions in superposition, and an external sector block adapted to be secured to said support in overlying relation to the exterior of the sector portion of the casing under repair, so that said casing is vulcanized in its normal operative shape.

3. The apparatus defined in claim 2, wherein said support is annularly split for convenience in assembly and provided with means for securing the split parts together.

4. Apparatus as defined in claim 2 wherein means are provided for heating said external sector block.

5. Apparatus as defined in claim 1 wherein said heater region is formed integrally with said annular inflatable bag.

6. Apparatus for repairing a tire or like casing by vulcanization comprising an annular tubular inflatable bag of resilient material of uniform cross-section throughout except for a relatively minor sector portion only of reduced cross-section, and a heater sleeve removably mounted on said reduced cross-section portion, said sleeve having such shape and size as to build up said reduced cross-section portion to the cross-section of the remainder of said bag when the latter is inflated and disposed within a casing.

CLYDE M. SEMLER.